US012370567B2

(12) United States Patent
Luo

(10) Patent No.: US 12,370,567 B2
(45) Date of Patent: Jul. 29, 2025

(54) MULTIPURPOSE KETTLE FOR DRINKING WATER, SPRAYING WATER AND SPRAYING MIST

(71) Applicant: Ningbo Zhongyi Jewelry Co., Ltd, Ningbo (CN)

(72) Inventor: Fengyun Luo, Guangzhou (CN)

(73) Assignee: Ningbo Zhongyi Jewelry Co., Ltd, Ningbo (CN)

( * ) Notice: Subject to any disclaimer, the term of this patent is extended or adjusted under 35 U.S.C. 154(b) by 355 days.

(21) Appl. No.: 18/134,052

(22) Filed: Apr. 13, 2023

(65) Prior Publication Data

US 2024/0342738 A1 Oct. 17, 2024

(51) Int. Cl.
*B05B 11/10* (2023.01)
*B65D 43/02* (2006.01)
(Continued)

(52) U.S. Cl.
CPC ........ *B05B 11/1047* (2023.01); *B05B 11/104* (2023.01); *B05B 11/1056* (2023.01);
(Continued)

(58) Field of Classification Search
CPC ............... B05B 11/1047; B05B 11/104; B05B 11/1067; B05B 11/1056; B65D 43/0225;
(Continued)

(56) References Cited

U.S. PATENT DOCUMENTS 4,179,070 A * 12/1979 Tada .................. B05B 11/1011 239/333
8,833,677 B2 * 9/2014 Chang ....................... A45F 3/20 239/327

(Continued)

*Primary Examiner* — Steven J Ganey
(74) *Attorney, Agent, or Firm* — Jose Cherson Weissbrot

(57) ABSTRACT

A multipurpose kettle for drinking water, spraying water and spraying mist comprises a kettle body and a kettle cover detachably connected to the upper end of the kettle body, wherein the kettle cover consists of an inner cover and an outer cover which are fixedly connected; a cavity is formed between the outer cover and the inner cover, and a spraying component is installed in the cavity; the mist spray component comprises a pump body, a piston slidably installed in the pump body, a water inlet pipe and a water outlet pipe connected with the pump body, a compression spring elastically supported between the piston and the water outlet pipe, steel balls for sealing arranged on the water inlet pipe and the water outlet pipe, a driving rod for driving the piston to move, and a force applying rod in transmission connection with the driving rod; the water inlet pipe passes through the inner cover and is connected to the bottom of the kettle body by a hose; the outer cover is provided with a mist spray head at the position corresponding to the water outlet pipe, and the upper end of the outer cover is also provided with an openable and closable spout formed by necking and a spout cover provided on the spout. The product is ingeniously designed, which can be directly drunk as a conventional kettle, and can also be used by spraying water and spraying mist to meet the daily simple cleaning needs.

10 Claims, 4 Drawing Sheets

(51) Int. Cl.
*B65D 51/18* (2006.01)
*B65D 51/24* (2006.01)

(52) U.S. Cl.
CPC ...... *B05B 11/1067* (2023.01); *B65D 43/0225* (2013.01); *B65D 51/18* (2013.01); *B65D 51/24* (2013.01); *B65D 2543/00092* (2013.01); *B65D 2543/00231* (2013.01)

(58) Field of Classification Search
CPC .................... B65D 51/18; B65D 51/24; B65D 2543/00092; B65D 2543/00231
USPC ........... 239/24, 33, 289, 320, 321, 329–333; 222/320, 321.7
See application file for complete search history.

(56) References Cited

U.S. PATENT DOCUMENTS

| | | | | |
|---|---|---|---|---|
| 10,518,282 | B2 * | 12/2019 | Ksiazek | B05B 11/1059 |
| 11,623,234 | B2 * | 4/2023 | Thompson | F04B 17/03<br>239/332 |
| 12,103,023 | B2 * | 10/2024 | Laikind | B05B 11/0086 |
| 12,110,157 | B2 * | 10/2024 | Tu | B65D 51/242 |
| 2008/0006718 | A1 * | 1/2008 | Junkel | B05B 11/0059<br>239/333 |
| 2016/0214125 | A1 * | 7/2016 | Hextall | B05B 1/16 |

* cited by examiner

MULTIPURPOSE KETTLE FOR DRINKING WATER, SPRAYING WATER AND SPRAYING MIST

TECHNICAL FIELD

The present invention relates to a multipurpose kettle for drinking water, spraying water and spraying mist.

BACKGROUND

Business trip, work, travel or school students usually carry a kettle, which is commonly used and has different shapes, but the existing kettle has a single function and generally only meets the direct drinking needs of users; in real life, it may be necessary to use a kettle to clean the face and hands or to clean local stains on the car body. If the water in the kettle is directly dumped, the water is easy to run out, and if the temperature of the water stored in the kettle is high, there may be a danger of scalding.

SUMMARY

In view of the shortcomings in the above problems, the present invention provides a multipurpose kettle for drinking water, spraying water and spraying mist.

In order to achieve the above purpose, the present invention provides a multipurpose kettle for drinking water, spraying water and spraying mist, including a kettle body and a kettle cover detachably connected to an upper end of the kettle body, wherein the kettle cover consists of an inner cover and an outer cover which are fixedly connected with each other: a cavity is formed between the outer cover and the inner cover, and a mist spraying component is installed in the cavity: the mist spray component comprises a pump body, a piston slidably installed in the pump body, a water inlet pipe and a water outlet pipe connected with the pump body, a compression spring elastically supported between the piston and the water outlet pipe, steel balls for sealing arranged on the water inlet pipe and the water outlet pipe, a driving rod for driving the piston to move, and a force applying rod in transmission connection with the driving rod: the water inlet pipe passes through the inner cover and is connected to a bottom of the kettle body by a hose: the outer cover is provided with a mist spray head at a position corresponding to the water outlet pipe, and an upper end of the outer cover is also provided with a spout formed by necking and an openable and closable spout cover provided on the spout.

As a further improvement of the present invention, the kettle body and the kettle cover form a quick-release connection by screwing.

As a further improvement of the present invention, the force applying rod is hinged with the driving rod, a mist spray button is fixed at a free end of the force applying rod, and the outer cover forms a notch at a position corresponding to the mist spray button.

As a further improvement of the present invention, the mist spray head is rotatably arranged on the outer cover, and the mist spray head is tightly sealed with the water outlet pipe.

As a further improvement of the present invention, the spout is further provided with a conical non-return part, and a lower part of the spout cover is provided with a hook part which interacts with the non-return part: the spout cover is made of an elastic material.

As a further improvement of the present invention, an upper surface of the mist spray button is textured.

As a further improvement of the present invention, the kettle body or the kettle cover is provided with a portable ring.

As a further improvement of the present invention, a side wall of the kettle body is provided with a recessed area so as to be convenient for a user to grasp.

As a further improvement of the present invention, a bottom of the kettle body is provided with an anti-skid pad.

As a further improvement of the present invention, a temperature sensing module is also arranged in the cavity of the kettle cover, and an indicator lamp is arranged on the outer cover; and the indicator lamp is electrically connected with the temperature sensing module.

Compared with the prior art, the present invention has the advantages that: the product is ingenious in design, can be directly drunk as a conventional kettle, can also be used by spraying water and spraying mist, and meets the daily simple cleaning requirements: the water stored in the kettle can be easily and laboriously pumped out by pressing the spraying button, and the spraying head can be rotated to realize the function switching of spraying water and spraying: The kettle also has the function of high temperature prompt, and the safety is high.

In the figures: 1, Kettle body; 11, Recessed area; 2, Portable ring; 3, Kettle cover; 31, Inner cover; 32, Outer cover; 321, Spout; 321*a*, Non-return part; 322, Spout cover; 322*a*, Hook part; 4, Mist spray components; 41, Hose; 42, Water inlet pipe; 43, Steel balls; 44, Mist spray head; 45, Water outlet pipe; 46, Compression spring; 47, Pump body; 48, Piston; 49, Driving rod; 49*a*, Force applying rod; 49*b*, Mist spray button.

DESCRIPTION OF EMBODIMENTS

Figure 1:
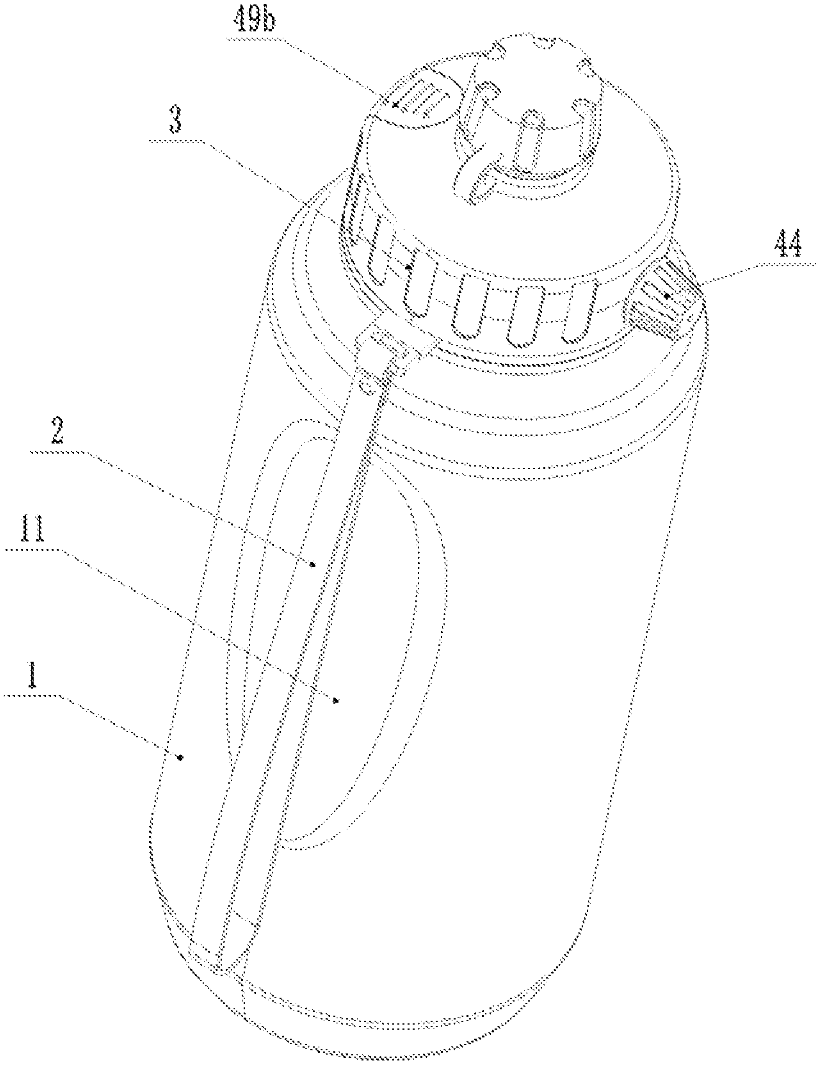
FIG. 1 is a perspective view of a multipurpose kettle for drinking water, spraying water and spraying mist according to Example 1.
Figure 2:
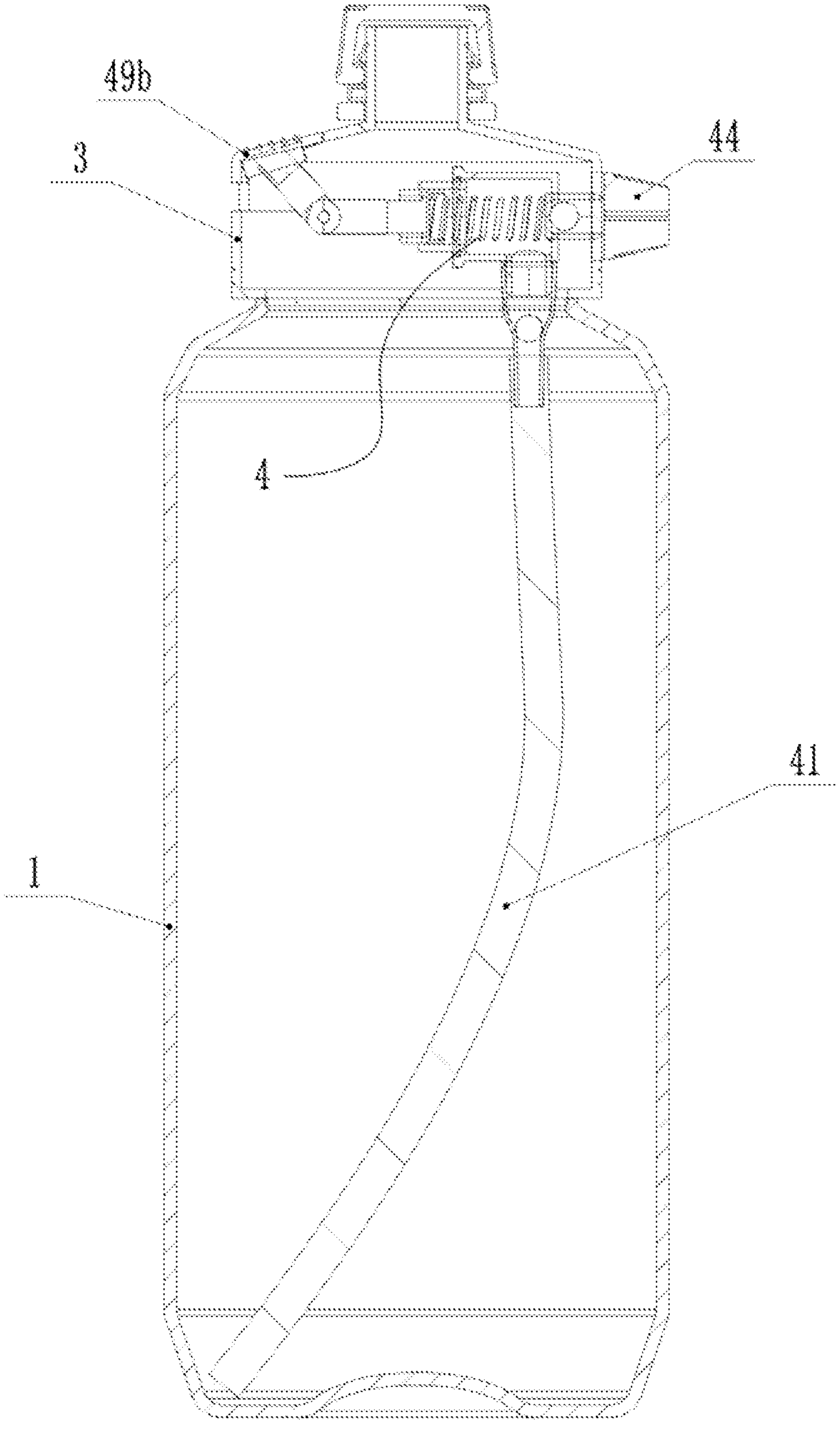
FIG. 2 is a sectional view of FIG. 1.
Figure 3:
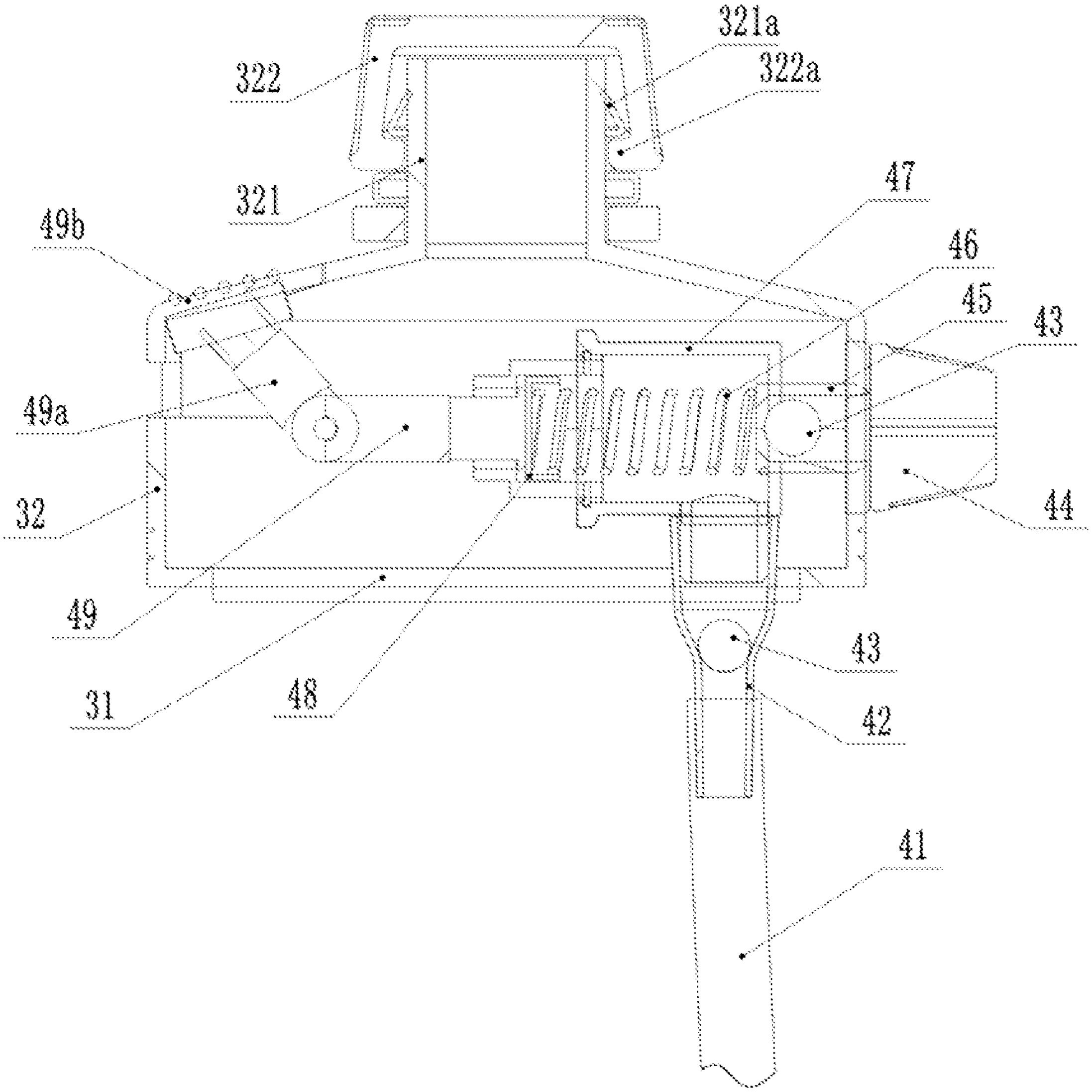
FIG. 3 is an enlarged view of the kettle cover in FIG. 2.

Example 1: As shown in FIG. 1, FIG. 2 and FIG. 3, a multipurpose kettle for drinking water, spraying water and spraying according to the embodiment of the present invention includes a kettle body 1 and a kettle cover 3 detachably connected to an upper end of the kettle body 1, wherein the kettle cover 3 consists of an inner cover 31 and an outer cover 32 which are fixedly connected with each other; a cavity is formed between the outer cover 32 and the inner cover 31, and a mist spraying component 4 is installed in the cavity; the mist spray component 4 comprises a pump body 47, a piston 48 slidably installed in the pump body 47, a water inlet pipe 42 and a water outlet pipe 45 connected with the pump body 47, a compression spring 46 elastically supported between the piston 48 and the water outlet pipe 45, steel balls 43 for sealing arranged on the water inlet pipe 42 and the water outlet pipe 45, a driving rod 49 for driving the piston 48 to move, and a force applying rod 49*a* in transmission connection with the driving rod 49; the water inlet pipe 42 passes through the inner cover 31 and is connected to a bottom of the kettle body 1 by a hose 41: the outer cover 32 is provided with a mist spray head 44 at a position corresponding to the water outlet pipe 45, and an upper end of the outer cover 32 is also provided with a spout 321 formed by necking and an openable and closable spout cover 322 provided on the spout 321: the kettle body 1 and the kettle cover 3 form a quick-release connection by screwing: quick-release design is convenient for pouring water into the kettle body 1: the force applying rod 49*a* is hinged with the driving rod 49, a mist spray button 49*b* is fixed at a free end of the force applying rod 49*a*, and the outer cover 32 forms a notch at a position corresponding to the mist spray button 49*b*, which makes the mist spray button 49*b* a part of the outer cover 32, and the product is beautiful: the mist spray head 44 is rotatably arranged on the outer cover 32, and the mist spray head 44 is tightly sealed with the water outlet pipe 45: by rotating the mist spray head 44, different spray effects can be achieved: the spout 321 is further provided with a conical non-return part 321*a*, and a lower part of the spout cover 322 is provided with a hook part 322*a* which interacts with the non-return part 321*a*; the spout cover 322 is made of an elastic material: leakage can be avoided by the action of the hook part 322*a* and the non-return part 321*a*; an upper surface of the mist spray button 49*b* is textured, which prevents slipping when pressing: the kettle body 1 or the kettle cover 3 is provided with a portable ring 2, which is convenient to carry: a side wall of the kettle body 1 is provided with a recessed area 11 so as to be convenient for a user to grasp: a bottom of the kettle body 1 is provided with an anti-skid pad: a temperature sensing module is also arranged in the cavity of the kettle cover 3, and an indicator lamp is arranged on the outer cover 32; and the indicator lamp is electrically connected with the temperature sensing module: when the temperature is too high, the indicator lights up to remind the user to avoid scalding.

Figure 4:
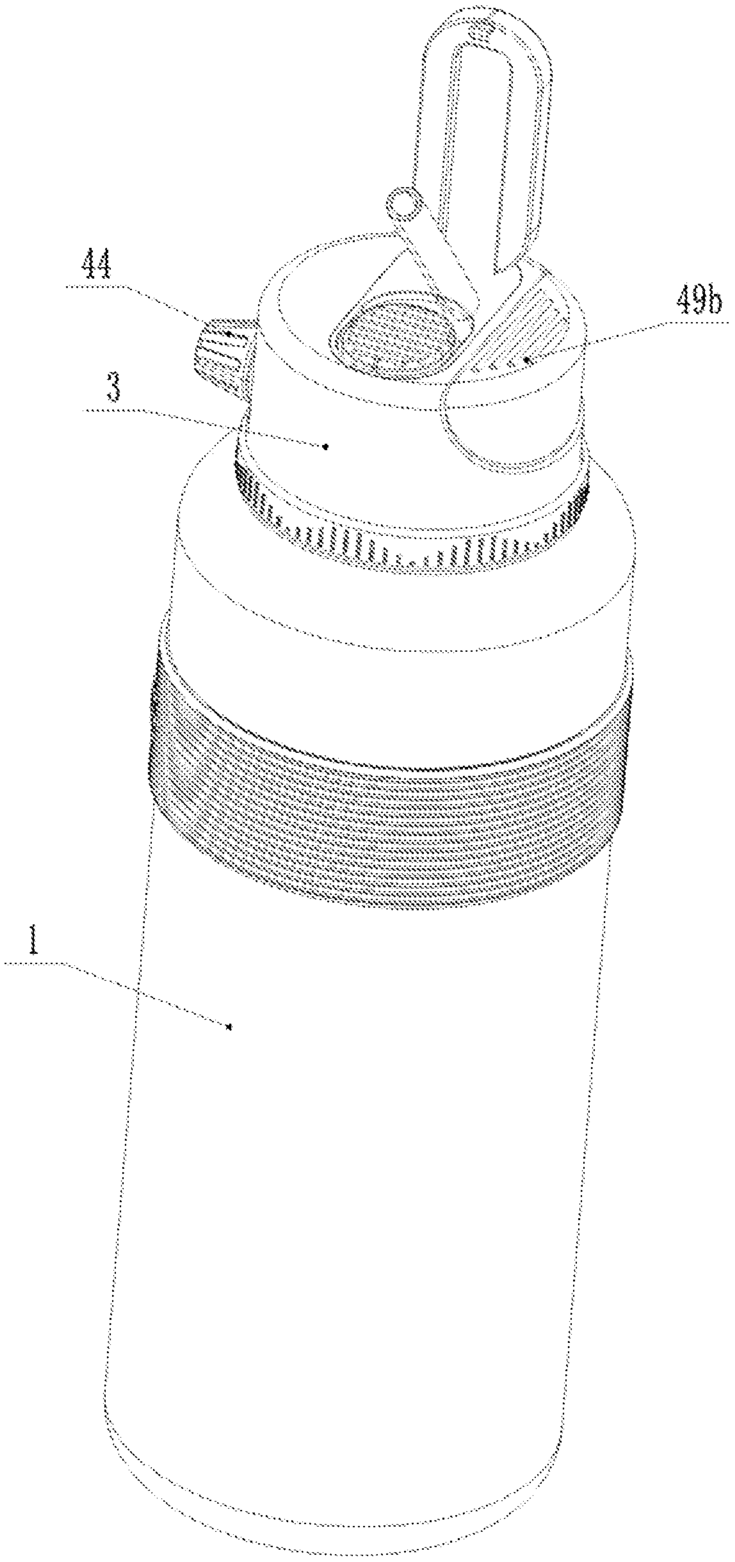
FIG. 4 is a perspective view of a multipurpose kettle for drinking water, spraying water and spraying mist according to Example 2.

Example 2: Consistent with Example 1, the mist spray component with a plunger pump structure pumps the water stored in the kettle body 1 to form mist spray, but the difference is that it also has a suction pipe, which is directly connected from the bottom of the kettle body 1 to the top of the outer cover 32, and a rotatable flip cover is arranged on the outer cover 32, and the flow passage of the suction pipe can be blocked after the flip cover is closed, as shown in FIG. 4.

The product is ingeniously designed, which can be directly drunk as a conventional kettle, and can also be used for water spraying and spraying, so as to meet the daily simple cleaning requirements. By pressing the mist spray button, the water in the kettle can be pumped out easily and laborsaving, and the mist spray head can be rotated, so as to realize the function switching of water spraying and mist spraying; the kettle also has the function of high temperature prompt, and the safety is high.

What has been described above is only the preferred embodiment of the present invention, and it is not used to limit the present invention. For those skilled in the art, the present invention may have various modifications and changes. Any modification, equivalent substitution, improvement, etc. made within the spirit and principle of the present invention should be included in the protection scope of the present invention.

What is claimed is:

1. A multipurpose kettle for drinking water, spraying water and spraying mist, comprising a kettle body and a kettle cover detachably connected to an upper end of the kettle body, wherein the kettle cover consists of an inner cover and an outer cover which are fixedly connected with each other; a cavity is formed between the outer cover and the inner cover, and a mist spraying component is installed in the cavity; the mist spray component comprises a pump body, a piston slidably installed in the pump body, a water inlet pipe and a water outlet pipe connected with the pump body, a compression spring elastically supported between the piston and the water outlet pipe, steel balls for sealing arranged on the water inlet pipe and the water outlet pipe, a driving rod for driving the piston to move, and a force applying rod in transmission connection with the driving rod; the water inlet pipe passes through the inner cover and is connected to a bottom of the kettle body by a hose; the outer cover is provided with a mist spray head at a position corresponding to the water outlet pipe, and an upper end of the outer cover is also provided with a spout formed by necking and an openable and closable spout cover provided on the spout.

2. The multipurpose kettle for drinking water, spraying water and spraying mist according to claim 1, wherein the kettle body and the kettle cover form a quick-release connection by screwing.

3. The multipurpose kettle for drinking water, spraying water and spraying mist according to claim 1, wherein the force applying rod is hinged with the driving rod, a mist spray button is fixed at a free end of the force applying rod, and the outer cover forms a notch at a position corresponding to the mist spray button.

4. The multipurpose kettle for drinking water, spraying water and spraying mist according to claim 3, wherein an upper surface of the mist spray button is textured.

5. The multipurpose kettle for drinking water, spraying water and spraying mist according to claim 1, wherein the mist spray head is rotatably arranged on the outer cover, and the mist spray head is tightly sealed with the water outlet pipe.

6. The multipurpose kettle for drinking water, spraying water and spraying mist according to claim 1, wherein the spout is further provided with a conical non-return part, and a lower part of the spout cover is provided with a hook part which interacts with the non-return part; the spout cover is made of an elastic material.

7. The multipurpose kettle for drinking water, spraying water and spraying mist according to claim 1, wherein the kettle body or the kettle cover is provided with a portable ring.

8. The multipurpose kettle for drinking water, spraying water and spraying mist according to claim 1, wherein a side wall of the kettle body is provided with a recessed area so as to be convenient for a user to grasp.

9. The m multipurpose kettle for drinking water, spraying water and spraying mist according to claim 1, wherein a bottom of the kettle body is provided with an anti-skid pad.

10. The multipurpose kettle for drinking water, spraying water and spraying mist according to claim 1, wherein a temperature sensing module is also arranged in the cavity of the kettle cover, and an indicator lamp is arranged on the outer cover; and the indicator lamp is electrically connected with the temperature sensing module.

* * * * *